(12) United States Patent
DeNies et al.

(10) Patent No.: US 6,920,210 B2
(45) Date of Patent: Jul. 19, 2005

(54) DEVICE AND METHOD FOR NETWORK COMMUNICATION

(75) Inventors: Steven G. DeNies, East Aurora, NY (US); Robert Fritzinger, Williamsville, NY (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 09/817,683

(22) Filed: Mar. 26, 2001

(65) Prior Publication Data

US 2001/0053155 A1 Dec. 20, 2001

Related U.S. Application Data

(63) Continuation-in-part of application No. 09/057,681, filed on Apr. 9, 1998, now Pat. No. 6,208,724.

(51) Int. Cl.[7] .............................................. H04M 3/42

(52) U.S. Cl. ............................ 379/201.01; 379/207.02; 379/219; 379/142.14

(58) Field of Search ....................... 379/201.01, 207.02, 379/219, 220.01, 220.02, 221.06, 229, 230, 242, 243, 221.01, 221.02, 265.09, 142.14, 93.15, 93.09; 370/466, 467

(56) References Cited

U.S. PATENT DOCUMENTS 5,911,123 A * 6/1999 Shaffer et al. ............ 455/554.1
6,134,246 A * 10/2000 Cai et al. ..................... 370/474
2001/0028649 A1 * 10/2001 Pogossiants et al.

* cited by examiner

Primary Examiner—William J. Deane, Jr.
(74) Attorney, Agent, or Firm—Blakely, Sokoloff, Taylor & Zafman LLP

(57) ABSTRACT

A method and device for allowing dissimilar networks to transfer information is disclosed.

16 Claims, 4 Drawing Sheets

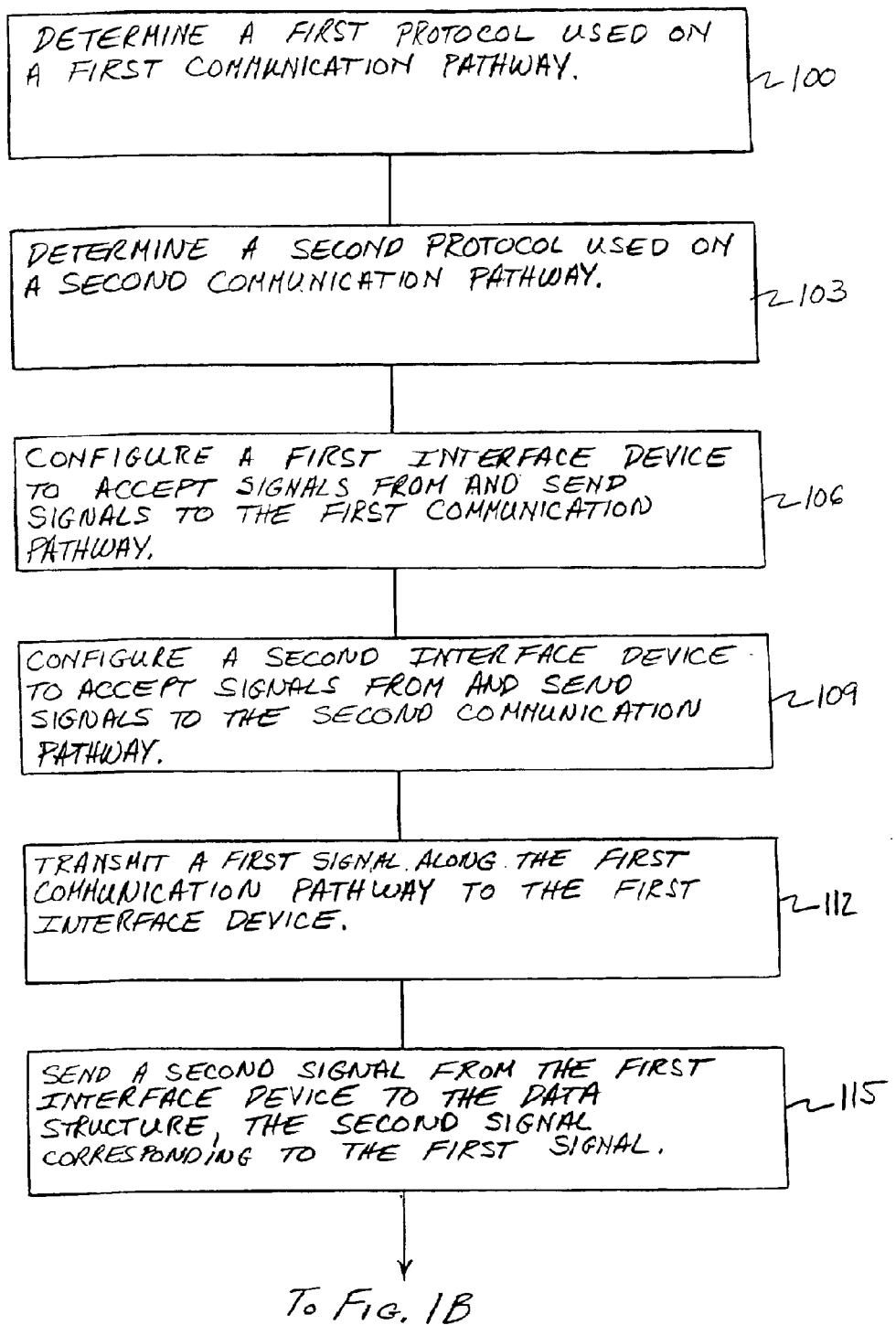

DEVICE AND METHOD FOR NETWORK COMMUNICATION

CROSS CLAIM TO RELATED APPLICATION

This application is a continuation-in-part of U.S. patent application Ser. No. 09/057,681 filed Apr. 9, 1998 now U.S. Pat. No. 6,208,724 entitled "Virtual Telephone", the entirety of which is hereby incorporated by reference.

BACKGROUND

This invention relates generally to the interoperability of system components, and more specifically, to devices and methods to allow two electrical/electronic devices operating on different protocols to communicate.

Telephony networks used by many business enterprises include a network of circuit-switched communications equipment supporting a plurality of terminal endpoints, typically digital telephone sets. The central communications control system is usually a private branch extension (PBX) or key system unit (KSU). Historically, a PBX serves a large business enterprise, typically having more than 200 telephone extensions, while a KSU services a small to medium business enterprise, typically with fewer than 400 telephone extensions. Such telephony networks include a telephony distribution system that manages the processes that result in voice signals being received at, and sent from, the terminal end points.

The typical business enterprise also has a data network that provides access to data services. Such data services are commonly accessed via a desktop computer terminal. The data network accepts and transmits information according to a data format. Typical data formats used by data networks include Internet Protocol (e.g. Internet Engineering Task Force, RFC-0760) and Ethernet (e.g. Institute of Electrical and Electronics Engineers, 802.3). While Internet Protocol and Ethernet are perhaps most common, other data formats, such as token ring (e.g. IBM Network Protocol), Apple Talk (e.g. Apple Computer Network Protocol), asynchronous transfer mode ("ATM") (e.g. as approved by the ATM Forum) and digital subscriber line (e.g. International Telecommunication Union, G.99x series), may be widely used.

In contrast to the data network, the telephony distribution system is usually based on proprietary protocols that are specified by the PBX or KSU vendor. The proprietary nature of the telephony distribution system limits interoperability between telephony distribution systems having different vendors to the most basic of telephony control and signal transport functions. Similarly, the differences between protocols used in telephony distribution systems and data networks inhibits, if not precludes, an exchange of information between them. The same is true of dissimilar data networks.

With an ever increasing number of protocols supporting electronic information exchange, there is a need to simplify the complexity of connecting communications devices to a communications network, such as a telephony network or a data network. For example, there is a desire in the industry to allow the exchange of information between a data network and a telephony network, and between dissimilar telephony networks, and between dissimilar data networks. Consequently, there is a need for a device and corresponding method that will determine the protocol of a first network, such as a data network or a telephony network, and that will determine the protocol of a second network, such as a data network or a telephony network, and allow the two networks to exchange information.

BRIEF DESCRIPTION OF THE DRAWINGS

An embodiment of the invention is understood by referencing the following detailed description taken in conjunction with the accompanying drawings, in which:

FIGS. 1A and 1B is a block flow diagram in accordance with one embodiment of the invention;

DETAILED DESCRIPTION

Figure 1B:
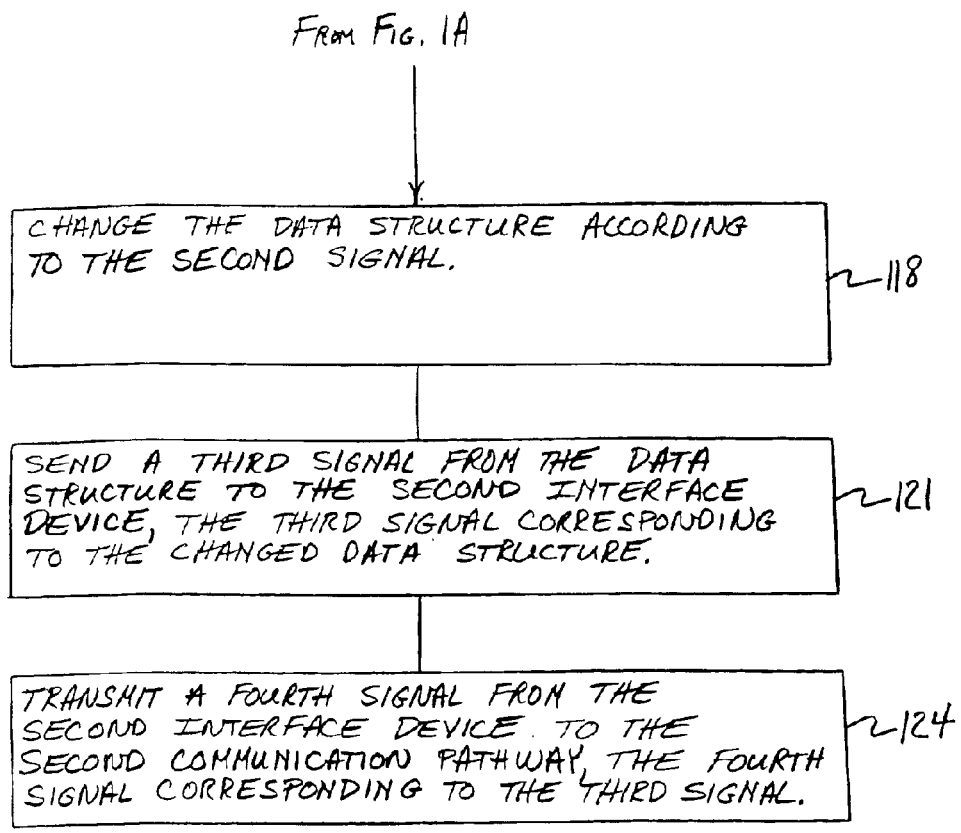
Figure 2:
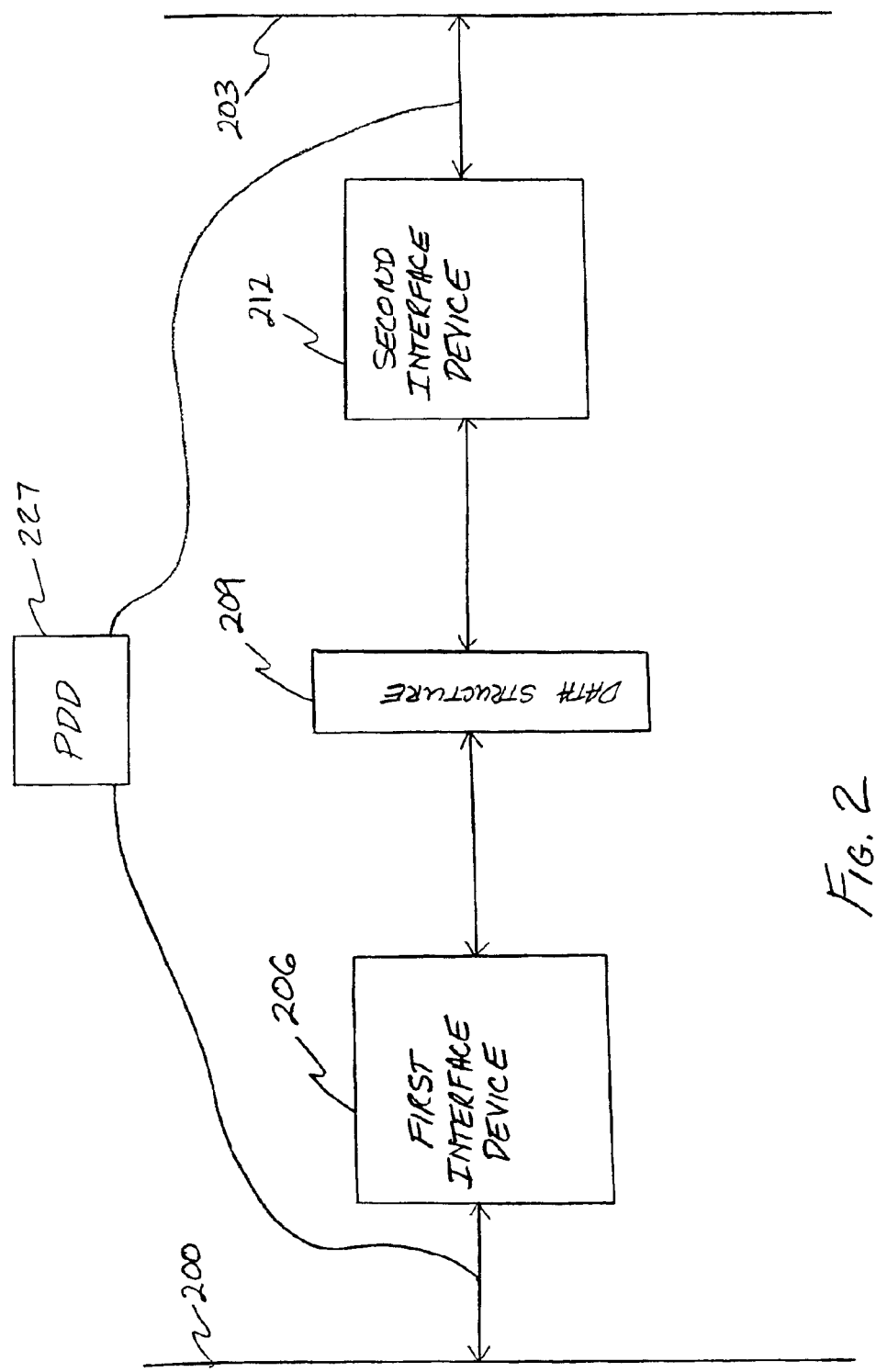
FIG. 2 is a block diagram of a device in accordance with one embodiment of the invention.

FIGS. 1A and 1B depict a method according to an embodiment of the invention, and FIG. 2 depicts a device according to an embodiment of the invention. An overview of the method and the device will now be provided using FIG. 2. The device shown in FIG. 2 transmits information between at least two communication pathways 200, 203. For example, information may be transmitted from pathway 200 to pathway 203 or from pathway 203 to pathway 200, or both. Different protocols may be used on the pathways 200, 203, and each pathway 200, 203 may be a telephony system or a network of computers. The device of FIG. 2 includes a data structure device 209. A first interface device 206 may be operatively connected between the data structure device 209 and the communication pathway 200. The first interface device 206 may be configured to convert signals on the pathway 200 into signals to modify the data structure device 209. The first interface device 206 may be configured to accept signals from the data structure device 209 and convert the signals into the protocol of the pathway 200.

The device of FIG. 2 also includes a second interface device 212 that may be operatively connected between the data structure device 209 and the communication pathway 203. The second interface device 212 may be configured to convert signals on the pathway 203 into signals to modify the data structure device 209. The second interface device 212 may be configured to accept signals from the data structure device 209 and convert the signals into the protocol of the pathway 203.

As a result, a signal sent along one of the communication pathways 200, 203 in one protocol is transmitted to the other one of the pathways 200, 203 in another protocol. Advantageously, the interface devices 206, 212 can be configured to a broad range of characteristics to be adaptable to many if not all known pathway protocols. This is in sharp contrast to existing devices which must be properly configured prior to installation to match the system to which they will be connected.

Referring now in detail to FIGS. 1 and 2, a method according to the invention may begin by determining a first protocol (operation 100) used on the first communication pathway 200, and determining a second protocol (operation 103) used on the second communication pathway 203. The first interface device ("FID") 206 may be configured (operation 106) to accept signals carrying information from the first communication pathway 200 in the first protocol, and send corresponding signals to the data structure device 209 in a protocol according to which the data structure device 209 is structured. Data structure device 209 can be a storage device in a processor. The FID 206 also may be configured to accept signals from the data structure device 209, and then transmit corresponding signals to the first communication pathway 200 in the first protocol.

Then, the second interface device ("SID") 212 may be configured (operation 109) to accept signals carrying information from the second communication pathway 203 in the second protocol, and send corresponding signals to the data structure device 209 in a protocol according to which the data structure device 209 is structured. The SID 212 also may be configured to accept signals from the data structure device 209, and then transmit corresponding signals to the second communication pathway 203 in accordance with the second protocol.

It should be noted that the interface devices 206, 212 have at least two functions. The first function is to convert signals on a corresponding one of the communication pathways 200,203 into messages that may be used to modify the state of the data structure device 209. The second function of the interface devices 206, 212 is to accept messages from the data structure device 209 and convert them into the respective protocols of corresponding ones of the communication pathways 200,203.

Once the first and second interface devices 206, 212 are configured, a first signal can be transmitted (operation 112) along the first communication pathway 200 to the FID 206. The FID 206 then sends a second signal (operation 115) to the data structure device (operation 118) to change a state of the data structure device 209 from a first state to a second state. The second signal corresponds to the first signal. The SID 212 periodically asks the data structure device 209 to inform the SID 212 of its current state. Upon detecting the change in the data structure device 209, the SID 212 receives a third signal sent (operation 121) from the data structure device 209. The third signal corresponds to the changed state of the data structure device 209. The SID 212 sends a fourth signal (operation 124) corresponding to the third signal in the second protocol to the second communication pathway 203. The fourth signal corresponds to the third signal. A signal sent via the second communication pathway 203 can similarly be transmitted to the first communication pathway 200 via the SID 212, the data structure device 209 and the FID 206. In this manner, the signal sent along one of the communication pathways 200, 203 in one protocol is transmitted to another of the communication pathways 200, 203 in another protocol.

Figure 3:
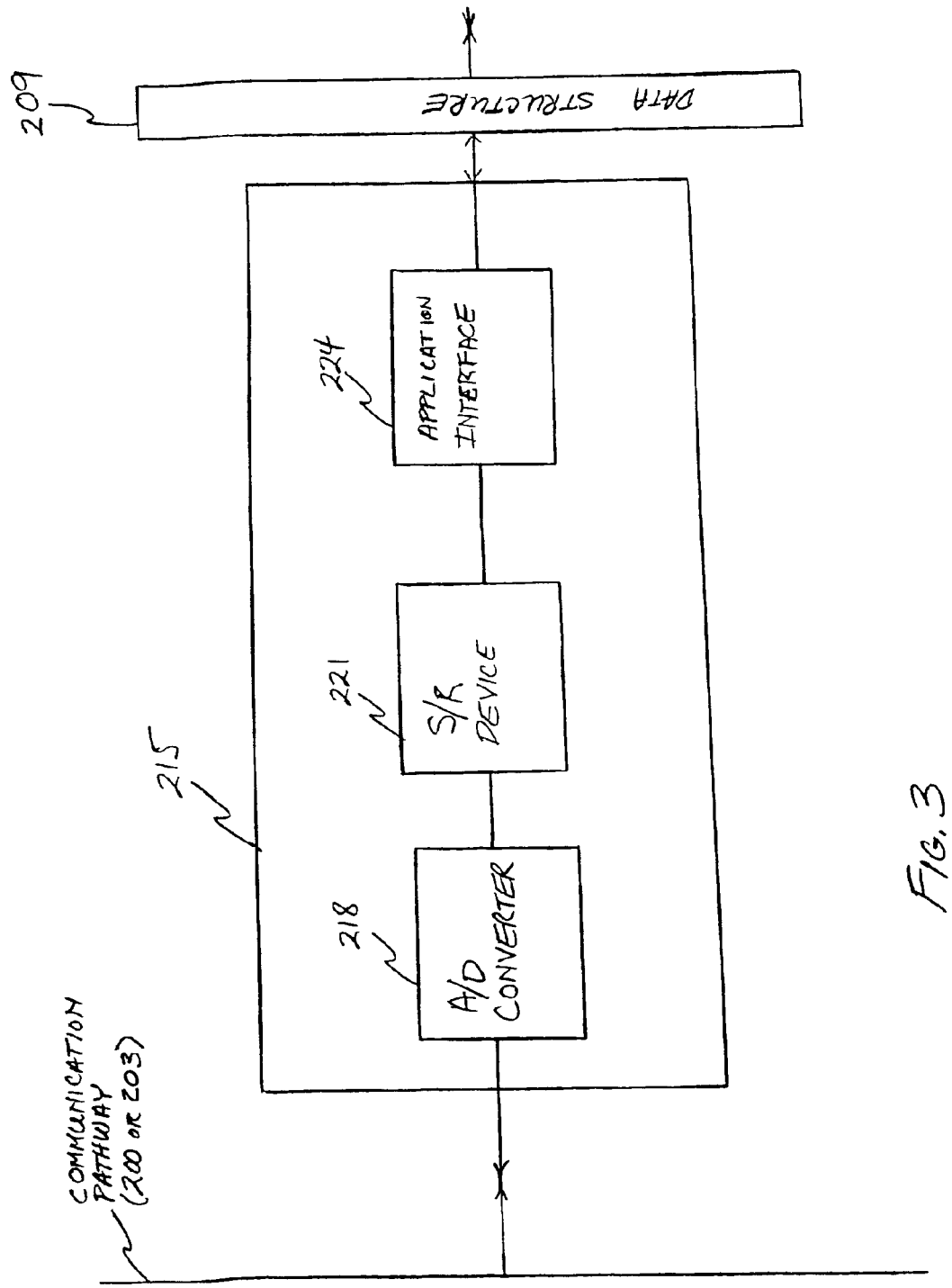
FIG. 3 is a block diagram of a portion of the device shown in FIG. 2 in accordance with one embodiment of the invention.

The FID 206 and the SID 212 may include similar components, and each is referred to herein generically as an interface device. An embodiment of a generic interface device 215 is depicted in FIG. 3. This embodiment is an implementation of one of the interface devices 206, 212, it being understood that the other interface device 206, 212 would be implemented by a similar embodiment. The interface device 215 according to the invention may include a configurable analog to digital ("A/D") converter 218, and a segmentation-and-reassembly ("S/R") device 221, and an application interface 224. In U.S. patent application Ser. No. 09/057,681, the virtual telephone described therein may be thought of as including the application interface 224 of the first interface device, the data structure device 209 and the application interface 224 of the second interface device.

The configurable A/D converter 218 may accept an analog signal from the attached pathway 200 or 203 and convert the analog signal to a corresponding unpacketized digital signal, and provide the unpacketized digital signal to the S/R device 221. The phrase "unpacketized digital signal" is used herein to mean a stream of time-ordered events. The A/D converter 218 also may accept an unpacketized digital signal from the S/R device 221 and convert it to a corresponding analog signal according to the network protocol used on the pathway 200, 203.

The S/R device 221 may accept the bits of the unpacketized digital signal from the A/D converter 218 and provide a corresponding packetized digital signal to the application interface 224. The phrase "packetized digital signal" is used herein to mean a digital signal that combines a series of time-ordered events into a group. The S/R device 221 also may accept a packetized digital signal from the application interface 224 and provide an unpacketized digital signal to the A/D converter 218.

The application interface 224 provides a signal to the data structure device 209 in a format recognized by the data structure device 209. The data structure device 209 provides a signal to the application interface 224 for conversion to a packetized digital signal to be provided to the S/R device 221.

The method according to an embodiment of the invention will now be described in more detail by describing one particular process. A first communication pathway 200 and a second communication pathway 203 are provided. It should be noted that the first communication pathway 200 may be a telephony system or a network of computers, and the second communication pathway 203 may be a telephony system or a network of computers. In this example for purposes of illustrating the method, the first communication pathway 200 is a telephony system and the second communication pathway 203 is a network of personal computers. A switch, such as a PBX or KSU, is connected to the first communication pathway 200 by a communication medium, such as twisted pair wire, co-axial cable, fiber optics, radio-frequencies and so forth. Next, the first communication pathway 200 is connected to the FID 206. Via the connection, the FID 206 has access to information and control signals carried on the first communication pathway 200.

Continuing with the example (for purposes of illustrating the method), a computer is connected to the second communication pathway 203, such as a bundle of wires. Next, the second communication pathway 203 is connected to the SID 212. Via the connection, the SID 212 has access to information and control signals carried on the second communication pathway 203.

A protocol determining device (PDD) 227 analyzes the electrical signals transmitted by the first communication pathway 200. The analysis performed by the PDD 227 may apply algorithms against an alternating current signal and a direct current signal carried by the first communication pathway 200. Once the analysis is complete, the PDD 227 selects a protocol from a group of protocols known to exist in distribution systems. A similar determination is made by the PDD 227 for the second communication pathway 203. Once the PDD 227 selects the protocols, each interface device 206, 212 is configured to operate in a manner required by the protocol used on the corresponding communication pathway 200, 203. Details of a method and device for determining a protocol are given in U.S. patent application Ser. No. 09/593,532 filed on Jun. 14, 2000 entitled "Interface Class Discovery Method And Device", the entirety of which is hereby incorporated by reference.

The FID 206 and the SID 212 may provide signal conditioning for incoming signals from the corresponding communication pathway 200, 203 to support extraction of data to assist the PDD 227 in discovering the protocol used by the first communication pathway 200. In this example, for purposes of illustrating the invention, the incoming signals from the first communication pathway 200 are analog in nature, and may represent data in several formats. Therefore, the FID 206 and the PDD 227 must be capable of handling many different types of incoming signals, including audio, video and digital signals. When the first communication pathway 200 supports a voice communications system, the incoming signals will typically represent either audio (20–3000 Hertz) or digital data, such as bit streams typically ranging from 2400 baud to well over one million baud.

In this example, for purposes of illustrating the invention, the incoming signals from the second communication pathway 203 are digital in nature and may also represent data in several formats. When the incoming signal is a digital signal, the incoming signal typically represents audio, device control, video, and potentially other types of information, and so the SID 212 must also be capable of handling many different types of incoming signals. The interface devices 206, 212 can be configured to a broad range of characteristics so that the interface devices 206, 212 are adaptable to many if not all known network protocols. This is a distinct advantage over existing devices that must be properly configured prior to installation to match the system to which they will be connected.

In configuring an interface device 206, 212, the interface device 206, 212 is configured to the specific impedance, voltage and reception/transmission parameters to support the exchange of information between the interface device 206, 212 and the corresponding communication pathway 200, 203. Details of a configuration process and circuitry for doing so are given in U.S. patent application Ser. No. 09/327,279 filed on Jun. 4, 1999 entitled "Adaptable Line Driver Interface For Digital Telephone Systems", the entirety of which is hereby incorporated by reference.

The interface devices 206, 212 include circuits which carry out the functions described above. The circuits are under the control of a processing unit. Interface devices 206 and 212 each may contain a processing unit, or a single processing unit may be provided for controlling both interface devices 206, 212. Among the circuits in an interface device 206, 212 may be (1) input clamping circuits to protect the interface devices 206, 212 from high voltages, (2) receiver buffer amplifiers with programmable gain or attenuation, (3) differential receiver amplifiers that are utilized to reject common mode voltages, (4) peak detectors to measure an incoming voltage amplitude, (5) comparators for signal conversion, (6) transmit drivers with programmable gain, (7) codecs analog to digital converters to convert analog voltages into digital values, (8) digital to analog converters, (9) reference voltage generators, used to measure signal levels and generate specific output voltages, (10) high pass and low pass filters with programmable cut-off frequencies, and (11) feed back circuits with programmable attenuation.

To analyze a telephony signal being transmitted over one of the communication pathways 200, 203, the PDD 227 may group telephony interface pins into two groups of 8 pins. Any of the 8 pins within a group must be capable of being paired with another one of the pins of the same group as a balanced pair. During the discovery mode, each of the 8 pins within a group may be examined for activity and subsequently paired with its balanced counterpart pin. A pin pair can be designated as simplex (input or output), half or full duplex. The frequency and signal ranges of each pair may also be analyzed in order to configure the telephony interface, and then subsequently monitored periodically for adjustment. A pin pair is preferably considered by the PDD 227 to be a balanced signal pair.

To accommodate existing systems the PDD 227 and the interface devices 206, 212 must be capable of supporting a wide range of voltages. The interface devices 206, 212 must also be capable of generating a battery voltage level to, for example, an attached digital or hybrid telephone. This battery voltage may be superimposed over signaling voltages. To accommodate currently known telephony networks, the battery voltage must be capable of ranging from 9 to 48 volts DC, with a power rating of 2 Watts max. Furthermore, in order to accommodate a wide variety of telephony networks, the pin pairings for delivering the battery voltage cannot be constrained. The delivery of battery power may be required across multiple pins. For example, 48V on pins 3 and 6, and 48V return on pins 1 and 2.

The current supplied by each pin must be balanced with that supplied by the corresponding pin in the balanced pair. Using the example above, pins 3 and 6 may be required to supply equal current into the lead, and correspondingly, pins 1 and 2 may be required to sink equal currents in return.

The impedance that an interface device 206, 212 presents is dependant upon the protocol for which it is being configured. For example, if the attached device is a digital PBX, then the impedance may be anywhere from 15 to 1200 ohms. Certain protocols require a very tight tolerance on impedance in order to adequately perform full duplex operation. Alternatively, in scenarios where the pin pair is used for audio voice transmission, the impedance is typically selected from among the values of 300, 600 or 900 ohms.

To determine a telephony protocol, the PDD 227 may analyze the balanced pair transmission circuits. The load on each pin of the balanced pair must be matched to ensure that control devices, such as line cards in a PBX system, do not saturate their output devices. Consequently, to accommodate an interface with a telephony network, the interface devices 206, 212 may include a receiver with a differential input that exhibits a high common mode rejection ratio. Although a common mode rejection ratio of 45 dB may be suitable, it is desirable to have a common mode rejection ratio of 60 dB.

For digital networks the incoming signals are binary in nature. Therefore, there is no need to preserve accurate amplitude information, but there is a need to distinguish between "marks" and "spaces". However, audio voice receivers in the interface devices 206, 212 need to preserve a total harmonic distortion of less than 3% across the full dynamic range (typically from 20 to 400 Hz) in order to preserve the quality of the signal. Transmitter circuits in an interface device 206, 212 will operate in differential mode. Balanced signaling is critical to maintain communications between an interface device 206, 212 and the corresponding communication pathway 200, 203.

To accommodate existing systems, the interface devices 206, 212 must be capable of handling 20 volt signal levels, perhaps riding on a battery voltage of 48 volts DC. Furthermore, all pins of an interface device 206, 212 that are used to connect with a telephony network should be capable of bit rates in excess of 1 MHz, pulse widths of 100 nanoseconds ("ns"), and timing precision of less than 10 ns.

The pulse streams on telephony interfaces contain timing information that represents the bit clocking information corresponding to the protocol. Multiple digital phase lock loops may be employed in the PDD 227 to extract the clocking information. Since the digital phase lock loop normally has a jitter tolerance of 10 ns, the PDD 227 may need to preserve the timing information so as not to add substantially to the overall jitter allowance.

Once the protocol of the first communication pathway 200 is determined and the FID 206 is configured, the FID 206 may support communications between the FID 206 and other elements associated with the first communication pathway 200. Once the protocol of the second communication pathway 203 is determined and the SID 212 is configured, the SID 212 may support communications between the SID 212 and other elements associated with the second communication pathway 203.

As described above, for purposes of illustrating the invention in the exemplary method, the second communication pathway 203 is a network of computers operating on a digital protocol. The SID 212 is able to accommodate a digital protocol on the second communication pathway 203. The SID 212 is capable of handling a data input signal, a data output signal, a clock signal and a frame signal. Preferably, the interface devices 206, 212 support bit rates of at least 2 to 10 Mbit/second ("Mbps").

A digital phase lock loop may be included among the hardware of an interface device 206, 212 to process a digital signal on the corresponding communication pathway 200, 203. The digital phase lock loop extracts timing information from the incoming bit stream from the communication pathway 200, 203. The resulting clock signal is used to sample the bit stream on the communication pathway 200, 203, and then store the bit stream in an orderly format in frame registers. The bit stream may consist of one or more individual streams, often referred to as "channels." To accommodate multiple channels, the interface devices 206, 212 may have multiple frame registers.

Also included in each interface device 206, 212 is a processing unit. The processing unit of an interface device 206, 212 provides rules that dictate the operation of the digital phase lock loop. These rules consist minimally of the representative bit period corresponding to the determined protocol. Additional rules may contain information related to violations that may be present in the bit stream, which may, for example, indicate special control sequences, allowable jitter and wander figures, or indicate whether the circuit is asynchronous, simplex, full or half duplex.

The interface devices 206, 212 also include a frame counter, for monitoring the number of bits received from the communication pathway 200, 203 and stored in a frame buffer. Each frame buffer enables the processing unit access time for processing a data frame. When the frame counter indicates a frame buffer has a sufficient number of bits for processing, the bits are transferred to a frame register for further processing. The frame register serves to store the incoming data streams in a format that can be readily processed by the processing unit of the interface device 206, 212. In operation, the frame counter is configured by the processing unit of the interface device 206, 212 according to the determined protocol. Known digital protocols are minimally a number of bits that constitute a frame, but may also include frame alignment information.

The interface devices 206, 212 may support multiple channels simultaneously. A processing unit of the interface device 206, 212 may be configured to build control packets for sending on the first communication pathway 200. In some implementations, the voice signal is supplied via a control bus used for the digital signal.

The interface devices 206, 212 may accommodate all known encoding schemes through configurable control registers. As an example, a known alternate mark inversion ("AMI") protocol, such as that used by a Lucent Definity switch to a corresponding telephone, presents data to the telephony interface as a pair of signals, represented by positive and negative pulses. These are presented to the interface device 206, 212 as two bit streams. The digital phase lock loop extracts timing information from a single stream derived by combining the two streams. The extracted timing information is used to store the bits into a pair of frame buffers. Framing information is derived from analysis of each bit stream individually. The frame boundary information is fed back into the control structure, and the processing unit of the interface device 206, 212 is notified when a new frame is available for processing.

In contrast to the immediately preceding example, another protocol, such as the Manchester encoding used between a Rolm switch and a Rolm Phone 400 telephone, presents data as a single bit stream, which may be examined for timing information by the digital phase lock loop of the interface device 206, 212. In this situation, framing markers are only present during initialization rather than on a continuously periodic basis.

Yet another protocol is best described as being similar to asynchronous RS-232 packets. Such a protocol is used between a Lucent Merlin II system and a Lucent 7300 series telephone. The bit stream contains data only when there is information to send. The "frame" of data is marked by a start bit that breaks the null period preceding it. The digital phase lock loop extracts timing information from this reference point. Data is collected into a single frame buffer and the processing unit of the interface device 206, 212 is notified. The frame buffer may be of variable size, with indication presented in the header of the packet. The ending frame boundary is followed by an intervening null period, subsequently broken by the next new frame packet.

Within each frame of data, the interface device 206, 212 may process individual or groups of bits as required by the determined protocol. There is no fixed association of bit positions with information content. The rules by which information is extracted vary with each protocol, and so the interface device 206, 212 is adaptable to the information extraction rules associated with each protocol.

It should be noted that the processing unit of an interface device 206, 212 is preferably fast enough to process individual bits rather than rely on specific clock extraction, frame registers and frame buffer circuits. In addition, to accommodate a broad range of protocols, the digital phase lock loop preferably accommodates bit rates over several orders of magnitude, and multiple bit envelopes. The frame counters preferably have half and full duplex, as well as simplex operation modes. Frame definitions can be asynchronous with start bit, multi-tiered frames, and may contain embedded frame sizing factors in the data stream.

Although the invention has been described with respect to one or more particular embodiments, it will be understood that other embodiments of the invention may be made without departing from the spirit and scope of the invention. Hence, the invention is deemed limited only by the appended claims and the reasonable interpretation thereof.

What is claimed is:

1. In a communication device, a method comprising:
    determining a first protocol in use on a first communication pathway;
    configuring a first interface device coupled with the first communication pathway to operate in accordance with the first protocol;
    determining a second protocol in use on a second communication pathway;
    configuring a second interface device coupled with the second communication pathway to operate in accordance with the second protocol;
    adapting a data structure device to communicate with the first and second interfaces devices; and the interface devices accepting signals from the data structure device and converting the signals into the protocols used on the respective communication pathways.

2. The method of claim 1 wherein a telephony network operates on the first communication pathway and a data network operates on the second communication pathway.

3. The method of claim 1 wherein the telephony network is a PBX network and the data network is and Internet Protocol (IP) network.

4. The method of claim 1 wherein the first and second interface devices are compatible with a plurality of protocols.

5. The method of claim 1 wherein determining the first protocol comprises applying algorithms against a signal carried by the first communication pathway, comparing a result from applying the algorithms against the plurality of protocols, and selecting the first protocol based on comparing the result against the plurality of protocols.

6. The method of claim 1 wherein determining the second protocol comprises applying algorithms against a signal carried by the second communication pathway, comparing a result from applying the algorithms against the plurality of protocols, and selecting the second protocol based on comparing the result against the plurality of protocols.

7. The method of claim 1 wherein configuring the interface devices comprises configuring the interface devices to specific impedance, voltage and reception/transmission parameters to receive and transmit signals in the protocol used on the respective communication pathways.

8. A communications device comprising:
a protocol determining device to determine a first protocol in use on a first communication pathway and a second protocol in use on a second communication pathway;
a first interface device coupled to the first communication pathway to operate according to the first protocol and to convert signals into the first protocol for transmission on the first communication pathway;
a second interface device coupled to the second communication pathway and the protocol determining device to operate according to the second protocol and to convert signals into the second protocol for transmission on the second communication pathway; and
a data structure device coupled to the first and second interface devices to exchange signals with the first and second interface devices.

9. The communications device of claim 8 wherein a telephony network operates on the first communication pathway and a data network operates on the second communication pathway.

10. The communications device of claim 9 wherein the telephony network is a PBX network and the data network is and Internet Protocol (IP) network.

11. The communications device of claim 6 wherein the data structure device is a storage device in a processor.

12. The communications device of claim 6 wherein the first interface device is configured to specific voltage, impedance, and reception/transmission parameters required by the first protocol.

13. The communications device of claim 6 wherein the second interface device is configured to specific voltage, impedance, and reception/transmission parameters required by the second protocol.

14. The communications device of claim 6 wherein the first and second interface devices are compatible with a plurality of protocols.

15. The communications device of claim 6 wherein the protocol determining device applies algorithms against a signal carried by the first communication pathway, compares a result of the applied algorithms against the plurality of protocols, and selects the first protocol based on comparing the result against the plurality of protocols.

16. The communications device of claim 6 wherein the protocol determining device applies algorithms against a signal carried by the second communication pathway, compares a result of the applied algorithms against the plurality of protocols, and selects the second protocol based on comparing the result against the plurality of protocols.

* * * * *